Sept. 29, 1925.  
F. E. HODDERSEN-BALLING  
1,555,372  
HAM COOKER  
Filed Nov. 25, 1921
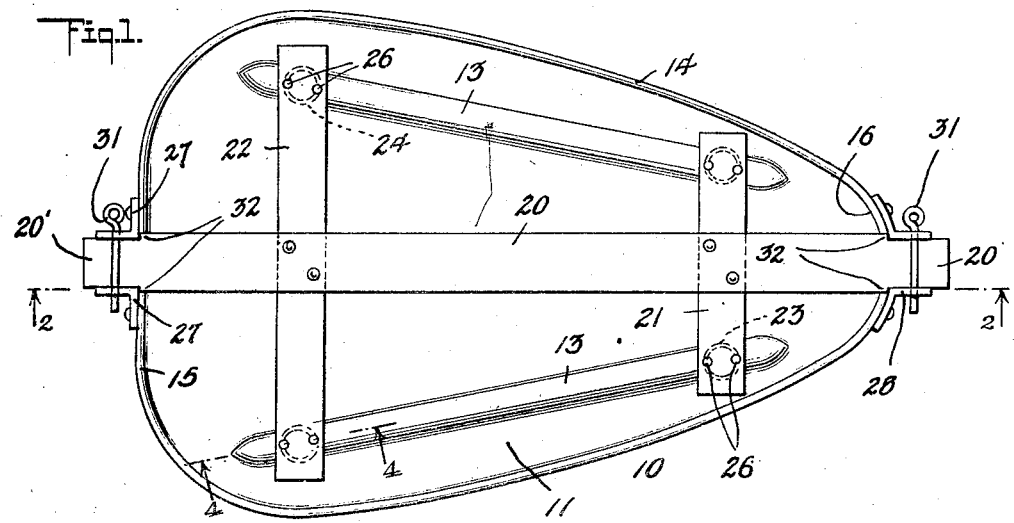
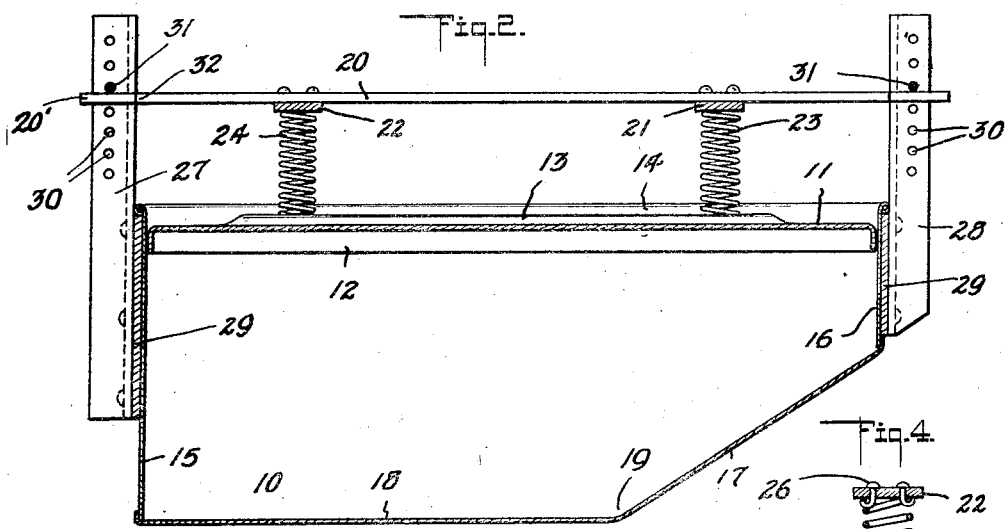
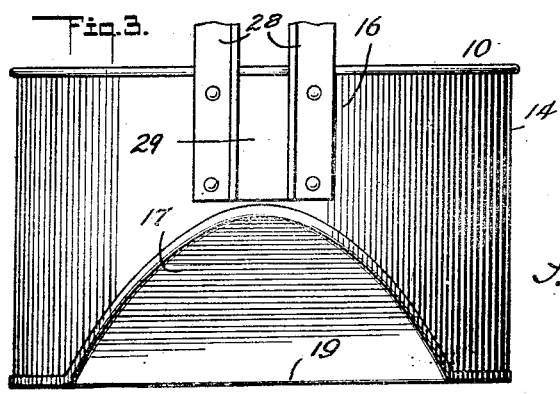
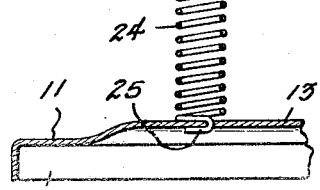
INVENTOR  
F. E. Hoddersen=Balling  
BY  
ATTORNEYS Patented Sept. 29, 1925.

1,555,372

UNITED STATES PATENT OFFICE.

FREDERICK EDWARD HODDERSEN-BALLING, OF BROOKLYN, NEW YORK.

HAM COOKER.

Application filed November 25, 1921. Serial No. 517,556.

*To all whom it may concern:*

Be it known that I, FREDERICK EDWARD HODDERSEN-BALLING, a citizen of the United States, residing at the city of New York, borough of Brooklyn, in the county of Kings and State of New York, have invented certain new and useful Improvements in Ham Cookers, of which the following is a specification.

This invention relates to meat cooking appliances, and has particular reference to a device for boiling or cooking hams and at the same time shaping them in the most convenient or suitable form for slicing on meat slicing machines in delicatessen stores or the like.

Among the objects of the invention is to provide a meat or ham cooker so shaped as to provide for the formation of square or rectangular slices, the form best suited for the making of sandwiches or the like, and yet which is so constructed that there will be a less amount of waste at the knuckle end of the ham, a matter of tremendous importance from the practical viewpoint of the merchant or dealer.

A further object of the invention is to provide a reliable means for securely locking the cover to the body of the cooker in such a manner as to make it practically impossible for loosening or displacement thereof in cooking or the handling of the device, but which at the same time will permit the cover to adapt itself automatically for taking up in accordance with the natural shrinkage of the ham or meat in the cooking action.

Other objects of this invention will appear in the following description thereof and the appended claims, reference being had to the accompanying drawings, in which like reference characters designate the same parts in the several views, and in which—

Figure 1 is a plan view.

Fig. 2 is a vertical longitudinal section of the same on the line 2—2 of Fig. 1.

Fig. 3 is a right hand elevation of the body of the cooker, parts being broken away.

Fig. 4 is a vertical sectional detail on the line 4—4 of Fig. 1.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

While the cooker body and cover may obviously be formed of any suitable kind or quality of material I have indicated that the body 10 is made of several pieces of sheet material suitably seamed together, while the cover 11 is made of one piece of sheet metal suitably stamped to form a flange 12 projecting downward and stiffening ribs 13 convexed upward.

The body 10, in plan, is oval in form to approximate the general shape of a ham, and this part of the device has vertical side walls 14 and vertical end walls 15 and 16. Said walls being all vertical insures that the ham or other piece of meat pressed and cooked therein will produce a perfectly square or rectangular slice when cut transversely. The end 16 pertaining to the small or knuckle end of the ham is shallower than the remaining portions of the body. Hence when a ham is made and inserted into this cooker, the application of force depressing the cover 11 will place the ham under sufficient compression for its purpose and will not cause the squeezing or crowding of any material portion of the fat or other parts of the main portion of the ham into the space occupied and practically filled at the small or knuckle end of the cooker. In a ham as ordinarily made and cooked the knuckle end is caused to become much larger than necessary due to the fact that there is so much excess space in the knuckle end of the cooker and into which space a considerable amount of fat or other relatively soft portions of the ham is squeezed or forced by the pressing action of the cooker cover. The result is that a very large amount of the ham becomes identified with the knuckle end of the ham on the slicing machine and so constitutes a tremendous element of waste because the final knuckle end of the ham must either be thrown away or else sold at a very low price compared with the price ordinarily obtained for the better parts of the meat. For this reason it follows that one of the objects of this device is to prevent this loss in value in the cutting and slicing of the ham. To accomplish this object I provide a portion 17 of the bottom 18 of the cooker adjacent to the knuckle end wall 16 in such form or position as to provide no more space for the small end of the ham than its natural construction demands. I show this bottom end portion 17 as being inclined upward from an angle 19 which coincides with the level or flat main portion of the bottom. Thus the vertical thickness of the knuckle end of the finished ham will be ordinarily less than one-half the thickness of the main portion of the ham and at the same time the top of the ham as it lies upon the slicing table, being that portion which coincides with the bottom portion 17 and 18 of the cooker, will present an unusually pleasing appearance.

From what has just been stated above it will be understood that the bottom of the ham as it lies upon the cutting table corresponds to the part against which the cover 11 bears during the pressing and cooking action, and hence this portion is ordinarily flat except for the formation of as many ribs as there are grooves formed in the cover in the making of the ribs 13. In other words while I indicate herein two of the ribs 13, convexed upward from the inside, there are formed two corresponding ribs or extensions on that part of the ham upon which the ham lies on the cutting machine table. These ribs on the ham, not shown, form naturally a pair of cushions which lie in direct contact with the surface of the table and which sustain the main portion of the pressure set up by the clamping means of the slicing machine. Therefore the ham is less liable to be spoiled during the slicing operation as a result of the tendency of the clamping means to separate the several portions of the ham into which it is more or less sub-divided during the boning operation.

Any suitable means may be provided to manipulate the cover and hold it in position with respect to the body of the cooker. To this end I show a main longitudinal handle or bar 20, extending above the body and slightly longer than the body at both ends. To this bar 20 I rigidly attach a pair of cross bars 21 and 22 overlapping in extent the end portions of the cover ribs 13 and spaced upward therefrom. Between the ends of the cross bars and the cover ribs I show a plurality of cushions in the form of coil springs 23 and 24, preferably of the same length and secured by suitable means permanently to the cross bars and the cover. As one practical means for making such a connection, the lower end of each spring is projected through the rib 13 as at 25, while the upper end of the coil spring is clamped by means of one or more hook shaped rivets 26 extending through the cross bar. The hook 25 lying entirely within the rib 13 of the cover is not likely to engage any part of the body of the ham, and moreover the springs seated upon the ribs bear upon the stiffest and strongest portions of the cover.

Extending upward from the outside of the end walls 15 and 16 are pairs of parallel stanchions 27 and 28, shown in the form of angle bars each having a flange secured directly against the end wall and another flange extending directly outward from said wall corresponding to the flange of the other member. The stanchions may be riveted against or through stiffener plates 29 on the outside of the end walls. The parallel flanges of these pairs of stanchions are provided with transverse horizontal aligned holes 30 through any selected pair of which may be passed a locking member, such as a pin 31, the same extending across the extended end 20' of the bar 20. Each of these extended ends is defined by a pair of shoulders 32 lying within the angles or edges of the angle members, whereby the bar 20 is held from endwise movement while the stanchions hold the bar from lateral movement.

After the ham is boned and made in any usual or acceptable manner it is placed into the cooker body 10, the size of the body being selected according to the size of the ham, and with the knuckle end thereof extending over the portion 17 of the bottom adjacent to the end 16. The knuckle end of the ham naturally has a relatively small amount of flesh and occupies correspondingly little space. When therefore the cover is introduced and pressed downward by any suitable hand or power means the ham is suitably compressed for its purpose and hardly any flesh of the ham is forced from the main portion thereof into the knuckle end. These cookers filled as indicated are placed into a vat of water or the like at a suitable temperature where they are left for a sufficient length of time to cook them. During the cooking action there is some shrinkage, and because the cover is subjected to the expansive force of the springs 23 and 24, reacting upward against the bar 20 and locked from movement by the pin 31, the cover is forced downward upon the ham, whereby the sides of the ham are maintained in substantial contact with the vertical walls of the cooker body. Hence when the ham is removed at the end of the cooking operation it will have a form corresponding to the plan of the cooker and of a substantially uniform thickness, save for a reduction in thickness incident to the offset 17. The cover being locked in place by means of the stanchions and pins passing across the upper surface of the bar 20, the device may be lifted or otherwise handled freely by lifting directly upon any portion of the bar.

By locating the springs in the manner shown, two at the wider end of the cover and two at the narrow end, it will be observed that the cover is pressed down at four points instead of along the center thereof as has heretofore been the practice and thus any wobbling of the cover is obviated, while at the same time considerable more pressure can be exerted on the cover to press the ham equally at all points within the body and at the same time the removal of the cover is facilitated since it can be readily withdrawn evenly from the body.

In other words applicant has provided a cover having what may be termed a four-point suspension from the locking part which very much facilitates the insertion and the removal and equal pressure on the article to be cooked.

It is to be understood that by describing in detail herein any particular form, structure, or arrangement, it is not intended to limit the invention beyond the terms of the several claims or the requirements of the prior art.

I claim:

1. A ham cooker comprising an oval-shaped body having a relatively flat bottom provided with an upwardly inclined end at the narrow end of the body and having vertical side and end walls, a cover for said body, a handle locking bar having cross bars, and a four-point resilient connecting means between said cross bars and cover.

2. A ham cooker comprising a body and a cover, said cover having converging reinforcing ribs, means for locking the cover in place and including a lengthwise extending bar, a pair of cross bars, and resilient means between and permanently connecting the ends of the cross bars and ribs.

3. A ham cooker comprising a body and a cover, said cover having a pair of ribs extending substantially throughout the length of the cover and in substantial parallelism with the lengthwise edges thereof and means for holding the cover in place and including a lengthwise extending bar, a pair of cross bars, and a plurality of resilient means between and permanently connecting the cross bars and ribs.

4. A ham cooker comprising an oval-shaped body having a relatively flat bottom provided with an upwardly inclined end and having vertical side and end walls, the inclined end terminating substantially midway of the height of said walls, a cover having a plurality of ribs spaced wider apart at one end of the cover than at the other and means for locking the cover to the body and including a lengthwise extending bar, a pair of cross bars connected therewith, and resilient means located between the ends of said cross bars and said ribs and permanently connecting the cross bars and cover, said body having two pairs of upright members secured to the ends of the body, each pair provided with alined openings and means cooperating therewith and with the lengthwise extending bar of the cover.

5. A ham boiler comprising a body and a cover, means for securing the body to the cover and including a lengthwise extending bar, a pair of cross bars and resilient means located between the ends of the cross bars and the cover.

6. A ham cooker comprising a body and a cover, and means adapted to connect the cover with the body and including means having a four-point resilient suspension means therebetween and said cover, a pair located at each side of the longitudinal axis of the cover.

In testimony whereof I affix my signature.

FREDERICK EDWARD HODDERSEN-BALLING.